(12) United States Patent
Zhou et al.

(10) Patent No.: US 9,576,058 B2
(45) Date of Patent: Feb. 21, 2017

(54) DETERMINING ACCURACIES WITH WHICH TYPES OF USER IDENTIFYING INFORMATION IDENTIFY ONLINE SYSTEM USERS

(71) Applicant: Facebook, Inc., Menlo Park, CA (US)

(72) Inventors: Li Zhou, Campbell, CA (US); Ian K. Abernathy, Austin, TX (US); Yunzhi Gao, Menlo Park, CA (US); Kosin Sutthimala, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 269 days.

(21) Appl. No.: 14/487,938

(22) Filed: Sep. 16, 2014

(65) Prior Publication Data
US 2016/0078134 A1   Mar. 17, 2016

(51) Int. Cl.
   G06F 17/30   (2006.01)
(52) U.S. Cl.
   CPC .............................. G06F 17/30867 (2013.01)
(58) Field of Classification Search
   CPC .............. G06F 17/3053; G06F 17/3097; G06F 17/30867
   USPC .................................................. 707/734, 733
   See application file for complete search history.

(56) References Cited

U.S. PATENT DOCUMENTS

| 9,275,272 | B2 * | 3/2016 | Barak et al. ................. 707/734 |
| 2007/0005750 | A1 * | 1/2007 | Lunt et al. ................... 709/223 |
| 2012/0166532 | A1 | 6/2012 | Juan et al. |
| 2014/0156360 | A1 | 6/2014 | Shalita et al. |
| 2014/0156566 | A1 | 6/2014 | Kabiljo et al. |
| 2014/0156744 | A1 | 6/2014 | Hua et al. |
| 2015/0088663 | A1 * | 3/2015 | Schechter et al. ......... 705/14.67 |
| 2015/0142551 | A1 * | 5/2015 | Papakipos et al. ........ 705/14.41 |

OTHER PUBLICATIONS

Abbar et al., Ranking Item Featurs by Mining Online User-Item Interteractions, IEEE, Marc 31—Apr. 2014, 460-471.*

* cited by examiner

Primary Examiner — Jean B Fleurantin
(74) Attorney, Agent, or Firm — Fenwick & West LLP

(57) ABSTRACT

An online system matches a user with a user of a third party system by comparing user identifying information maintained by the online system with user identifying information maintained by the third party system. To determine how accurately different types of user identifying information identify an online system user, types of user identifying information maintained by the online system are compared to types of user identifying information maintained by the third party system. A score is associated with various online system users based on the number of types of user identifying information associated with the user by the online system matching types of user identifying information associated with a third party system user. Based on the scores associated with different users, a measure of accuracy in identifying an online system user is determined for each type of user identifying information.

24 Claims, 3 Drawing Sheets

400

| Online System User ID 402 | Name 405A | Date of Birth 405B | Gender 405C | Location 405D | Email 405E | Phone Number 405F | Score 410 |
|---|---|---|---|---|---|---|---|
| 1234 | 1 | 0 | 1 | 1 | 0 | 0 | 3 |
| 5678 | 1 | 1 | 1 | 0 | 1 | 1 | 5 |
| 8564 | 0 | 0 | 1 | 0 | 0 | 0 | 1 |
| 3423 | 1 | 1 | 1 | 1 | 1 | 1 | 6 |

415

| Type of User Identifying Information 405 | Measure of Accuracy 420 |
|---|---|
| Date of Birth & Email | 97% |
| Email | 95% |
| Name, Gender, Location | 68% |
| Gender and Location | 3% |

DETERMINING ACCURACIES WITH WHICH TYPES OF USER IDENTIFYING INFORMATION IDENTIFY ONLINE SYSTEM USERS

BACKGROUND OF THE INVENTION

This disclosure relates generally to identifying users of an online system, and more particularly to identifying accuracies with which different types of user identifying information identify online system users.

Users interact with content provided by a variety of online systems, and multiple online systems may exchange limited information associated with a user to allow each online system to provide a user with more personalized content. Providing more personalized content enhances user interaction with an online system, increasing the amount of user interaction with the online system. Different online systems maintain user identifying information associated with each user, user identifying information associated with a user including different types of user identifying information.

To retrieve information associated with a user from an additional online system, an online system communicates one or more types of user identifying information associated with the user by the online system to the additional online system. The additional online system compares the received type of user identifying information to user identifying information associated with users of the additional online system an identifies a user of the additional online system associated with types of user identifying information matching the received types of user identifying information. However, different online systems may use different types of user identifying information to identify specific user, so an online system may be unable to accurately identify a user based on user identifying information received from an additional online system.

SUMMARY OF THE INVENTION

An online system determines a measure of accuracy with which different types of user identifying information identify a user of an entity, such as the online system. For example, the online system determines an accuracy with which a type of user identifying information received by the online system identifies a specific user of the online system. To determine a measure of accuracy of different types of user identifying information associated with a user, the online system identifies users from a pair of sources (e.g., the online system 140 and a third party system 130, two third party systems 130) and obtains user identifying information associated with each user by the sources. For example, the online system obtains user identifying information from the online system associated with a set of online system users and obtains user identifying information from a third party system associated with a set of third party system users. The user identifying information includes multiple types of user identifying information. Example types of user identifying information include: a name, a date of birth, an e-mail, a gender, a location, an online system user identifier, and a phone number.

For each of the identified users, the online system compares user identifying information associated with a user by a source to user identifying information associated with a user by another source. Based on the types of user identifying information associated with the user by the source matching the types of user identifying information associated with a user of the other source, the online system determines a score associated with the user of the source. For example, the score associated with a user of the source is a number of different types of user identifying information maintained by the source matching types of user identifying information associated with a user of the other source. As a specific example, if a date of birth, a gender, and a location associated with a user of the source match a date of birth, a gender, and a location associated with a user of the other source, the online system determines score of three is associated with the user of the source.

The online system determines measures of accuracy associated with different types of user identifying information or different combinations of types of user identifying information. A measure of accuracy associated with a type of user identifying information provides an indication of a likelihood the type of user identifying information identifying a particular user of a source. For example, if a source is the online system, an email address has a high measure of accuracy as it is capable of uniquely identifying a user of the online system, while a date of birth has a low measure of accuracy as it is unable to uniquely identify a particular user of the online system. In some embodiments, the determined measures of accuracy are based on the scores associated with users of the source having types of user identifying information matching user identifying information associated with users of the other source. For example, in some embodiments, the measure of accuracy of a type of user identifying information is an average score associated with users of a source associated with the type of user identifying information matching the type of user identifying information associated with a user of another source. Alternatively, the measure of accuracy of a type of user identifying information is a number of users of a source with the type of user identifying information matching the type of user identifying information associated with a user of another source and associated with at least a threshold score. Similarly, measures of accuracy may be determined for various sets that each include different of types of user identifying information.

The online system stores a ranking of types of user identifying information based at least in part on the measures of accuracy associated with different types of user identifying information. In some embodiments, the ranking includes types of user identifying information as well as sets of user identifying information. Alternatively, a ranking for individual types of user identifying information is maintained, while a separate ranking for sets of types of user identifying information is also maintained. For example, types of user identifying information with higher measures of accuracy (i.e., types of user identifying information more likely to identify a particular user) have higher positions in the ranking, while types of user identifying information with lower measures of accuracy (i.e., types of user identifying information less likely to identify a particular user) have lower positions in the ranking. The online system may receive a request from a source or other entity including a specified measure accuracy for identifying a particular user of another entity. Based at least in part on the ranking, the online system identifies one or more types of user identifying information or sets of types of user identifying information associated a measure of accuracy equaling or exceeding the specified measure of accuracy and communicates information describing the identified one or more types of user identifying information or sets of types of user identifying information to the requesting source or other entity

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE INVENTION

System Architecture

Figure 1:
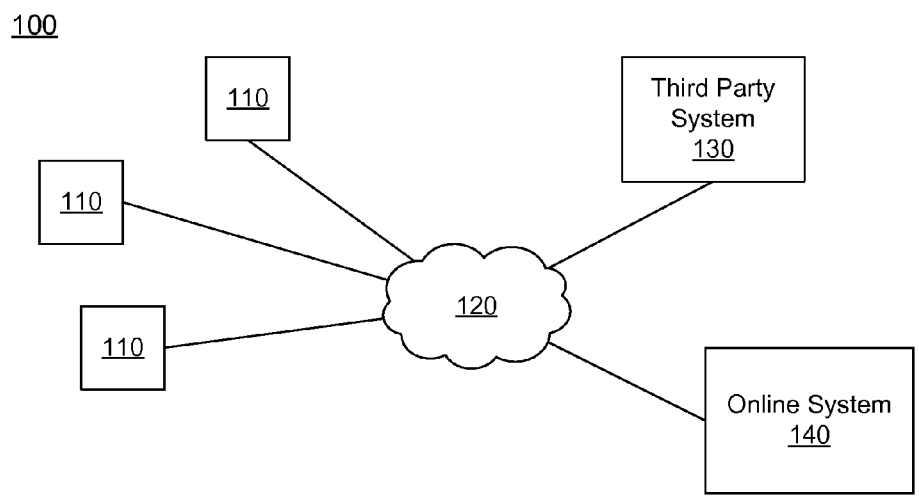
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In some embodiments, one or more third party systems 130 may be directly coupled to each other and/or to the online system 140. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
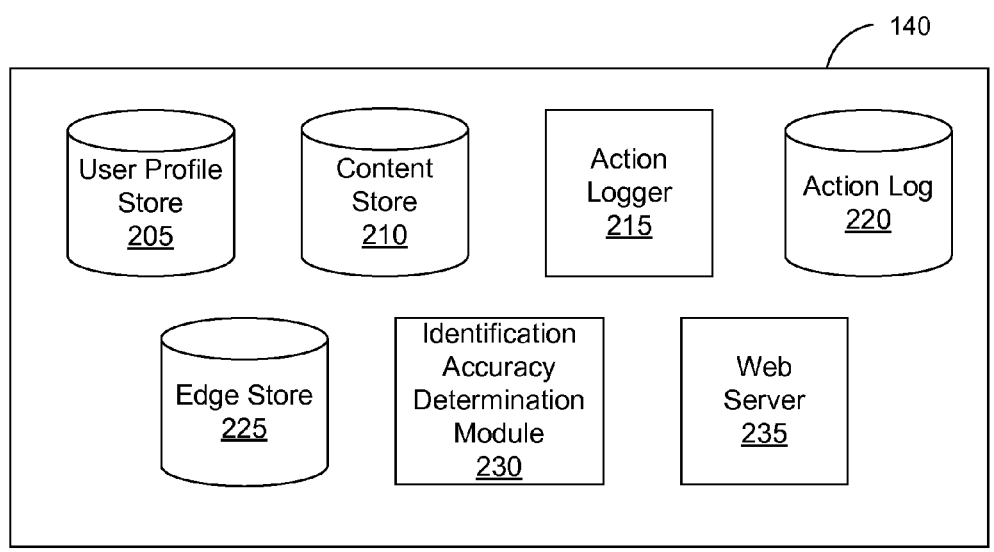
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an identification accuracy determination module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The identification accuracy determination module 230 determines a measure of accuracy with which different types of user identifying information identify a user of an entity, such as the online system 140. For example, the identification accuracy determination module 230 determines an accuracy with which user identifying information maintained by a third party system 130 matching types of user identifying information associated users maintained by the online system 140 accurately identify an online system user. As another example, the identification accuracy determination module 230 determines an accuracy with which user identifying information maintained by a third party system 130 matching types of user identifying information identifying users maintained by an additional third party system 130 accurately identify a user of the additional third party system 130.

To determine measures of accuracy of different types of user identifying information identifying a user, the identification accuracy determination module 230 identifies users from a pair of sources (e.g., the online system 140 and a third party system 130, two third party systems 130) and obtains user identifying information associated with each user by the sources. For example, the accuracy determination module 230 obtains user identifying information from the online system 140 associated with a set of online system users and obtains user identifying information from a third party system 130 associated with a set of third party system users. The user identifying information includes multiple types of user identifying information. Example types of user identifying information include: a name, a date of birth, an e-mail, a gender, a location, an online system user identifier, and a phone number. For each of the users, the identification accuracy determination module 230 compares user identifying information associated with a user by a source to user identifying information associated with a user by another source. In some embodiments, based on the types of user identifying information associated with the user by the source matching the types of user identifying information associated with a user of the other source, the identification accuracy determination module 230 determines a score associated with the user of the source. For example, the score associated with a user of the source is a number of different types of user identifying information maintained by the source matching types of user identifying information associated with a user of the other source. As a specific example, if a date of birth, a gender, and a location associated with a user of the source match a date of birth, a gender, and a location associated with a user of the other source, the accuracy determination module 230 associates a score of three with the user of the source.

In other embodiments, different types of user identifying information are associated with different weights, and the score associated with a user is based at least in part on the weights associated with types of user identifying information associated with the user by a source matching types of user identifying information associated with a user of the other source. For example, a phone number is associated with a higher weight than a gender, as a phone number associated with a particular user is more likely to identify the particular user than the gender associated with the particular user. Weights associated with types of user identifying information may be modified based on values associated with the type of user identifying information in some embodiments. For example, if user identifying information maintained by a source and including a name having a value of "Jones" and a location having a value of "Chicago" matches user identifying information maintained by the other source having a matching name value and location value, a weight associated with the name value is lower than if the matching values included a name having a value of "Jones" and a location of "Shanghai." This allows the weights associated with types of user identifying information to account for matches between other types of user identifying information.

Based on the scores associated with users of the source having types of user identifying information matching user identifying information associated with users of the other source, the identification accuracy determination module 230 determines measures of accuracy associated with different types of user identifying information or different combinations of types of user identifying information. A measure of accuracy associated with a type of user identifying information provides an indication of a likelihood of the type of information identifying a particular user of a source. For example, an online system user identifier has a high measure of accuracy as it is capable of uniquely identifying a user of the online system 140, while a date of birth has a low measure of accuracy as it is unable to uniquely identify a particular user of the online system 140. In some embodiments, the measure of accuracy of a type of user identifying information is an average score associated with users of a source associated with the type of user identifying information matching the type of user identifying information associated with a user of another source. Alternatively, the measure of accuracy of a type of user identifying information is a number of users of a source with the type of user identifying information matching the type of user identifying information associated with a user of another source and associated with at least a threshold score. Similarly, measures of accuracy may be determined for various sets of types of user identifying information, allowing the identification accuracy determination module 230 to evaluate the ability of different combinations of types of user identifying information to identify a particular user of a source, such as the online system.

The identification accuracy determination module 230 stores a ranking of types of user identifying information based at least in part on the measures of accuracy associated with different types of user identifying information. In some embodiments, the ranking includes types of user identifying information as well as sets of user identifying information. Alternatively, a ranking for individual types of user identifying information is maintained, while a separate ranking for sets of types of user identifying information is also maintained. For example, types of user identifying information with higher measures of accuracy (i.e., types of user identifying information more likely to identify a particular user) have higher positions in the ranking, while types of user identifying information with lower measures of accuracy (i.e., types of user identifying information less likely to identify a particular user) have lower positions in the ranking. The identification accuracy determination module 230 may receive a request from a source or other entity including a specified measure of accuracy for identifying a particular user of another entity. Based at least in part on the ranking, the identification accuracy determination module 230 identifies one or more types of user identifying information or sets of types of user identifying information associated a measure of accuracy equaling or exceeding the specified measure of accuracy and communicates information describing the identified one or more types of user identifying information or sets of types of user identifying information to the requesting source or other entity. Determining measures of accuracy associated with types of user identifying information is further described below in conjunction with FIGS. 3 and 4.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
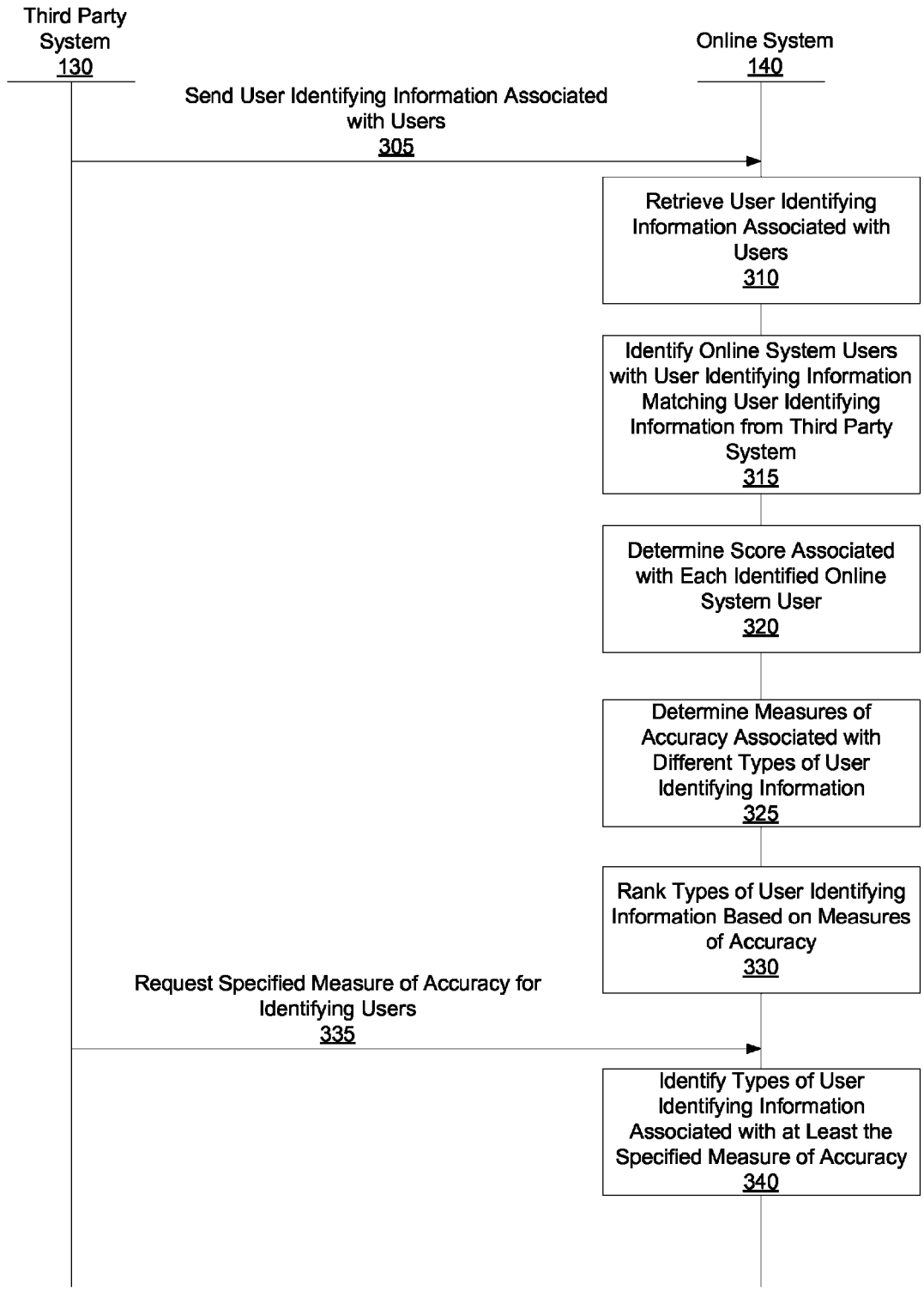
FIG. 3 is an interaction diagram of a method for determining measures of accuracy with which user identifying information maintained by a third party system matches user identifying information maintained by an online system, in accordance with an embodiment.

Determining Accuracy of Matching Users Based on Types of User Identifying Information FIG. 3 is an interaction diagram of a method for determining measures of accuracy associated with types of information identifying a type of information's likelihood of identifying a particular user of a source. For purposes of illustration, FIG. 3 shows an example where the online system 140 receives user identifying information from a third-party system 130 and determines measures of accuracy of different types of user identifying information for identifying a specific user of the online system 140. However, in other embodiments, the online system 140 may communicate user identifying information to the third-party system 130, which determines the measures of accuracy associated with types of user identifying information. In other embodiments, the online system 140 and a third party system 130 each communicate user identifying information including multiple types of user identifying information to another third party system 130, which acts as a third party auditor and determines the measures of accuracy associated with different types of user identifying information.

In the example of FIG. 3, a third party system 130 sends 305 user identifying information associated with multiple users of the third party system 130 to the online system 140. In some embodiments, the third party system 130 obfuscates the user identifying information and sends 305 the obfuscated user identifying information to the online system 130. For example, the third party system 130 sends 305 a hash of the user identifying information associated with various users of the third party system 130. Additionally, the online system 140 retrieves 310 user identifying information associated with multiple users of the online system 140. However, in other embodiments, the third party system 130 and the online system 140 each send user identifying information associated with users of the respective systems to another third party system 130, such as a third party auditor. User identifying information associated with users of the online system 140 or associated with users of the third party system 130 includes various types of user identifying information. Example types of user identifying information include: an online system identifier (or a third party system identifier), an e-mail address, a name, a phone number, a location, a gender, and a date of birth.

For each user of the online system 140 associated with retrieved user identifying information, the online system 140 compares user identifying information associated with a user of the online system by the online system 140 to received user identifying information associated with users of the third party system 130. Based on the comparison, the online system 140 identifies 315 online system users associated with user identifying information including one or more types of user identifying information matching a type of user identifying information included in user identifying information associated with a user of the third party system 130. For example, the online system 140 identifies 315 an online system user associated with a name and a location that match a name and location associated with a third party system user by the third party system 130 or identifies 315 an online system user associated with an email address matching an email address that matches an email address associated with a third party system user by the third party system 130.

A score is determined 320 for each online system user identified 315 as associated with at least one type of user identifying information by the online system 140 matching a type of user identifying information associated with a user of the third party system 130 by the third party system 130. In one embodiment, the score associated with an identified user is based on a number of types of user identifying information associated with the user by the online system 140 that match types of user identifying information associated with a user by the third party system 130. For example, a score associated with a user is a sum of the types of user identifying information associated with the user by the online system 140 matching types of user identifying information associated with a third party system user by the third party system 130. As a specific example, a score of 7 is determined 320 for an online system user associated with 7 types of user identifying information matching types of user identifying associated with a third party system user by the third party system 130.

In some embodiments, weights are associated with different types of user identifying information, the online system 140 determines 320 and a score associated with an identified online system user based on the weights associated with types of user identifying information associated with the identified online system user that match types of user identifying information associated with a third party system user by the third party system 130. For example, the online system 140 combines weights associated with types of user identifying information associated with an online system user that match types of user identifying information associated with a third party system user to determine 320 the score associated with the identified online system user. Alternatively, a score determined 320 for an identified online system user is a value based at least in part on a number or a percentage of types of user identifying information associated with the identified online system user matching types of user identifying information associated with a third party system user. However, in various embodiments, any suitable method may be used to determine 320 a score associated with an online system user identified 315 as having one or more types of user identifying information matching types of user identifying information associated with a third party system user.

Based on the determined scores, the online system 140 determines 325 a measure of accuracy associated with different types of user identifying information. Additionally, the online system 140 may determine 325 measures of accuracy associated with sets of types of user identifying information, with each set including multiple types of user identifying information. A measure of accuracy associated with a type of user identifying information represents a likelihood of the type of user identifying information identifying a specific user of the online system 140 or of the third party system 130. For example, a type of user identifying information associated with a measure of accuracy of 0.97 has a 97% likelihood of identifying a specific user of the online system 140 if received by the online system 140. Similarly, a measure of accuracy associated with a set of types of user identifying information indicates the likelihood of identifying a specific user of the online system 140 when the online system 140 receives the types of user identifying information in the set. While FIG. 3 describes measures of accuracy with respect to identifying users of the online system 140 for purposes of illustration, in other embodiments, the measures of accuracy are based on identification of a user by the third party system 130 or by another third party system 130 that receives the type of user identifying information.

A measure of accuracy associated with a type of user identifying information is determined 325 based on scores associated with identified users having the type of user identifying information matching the type of user identifying information associated with a user of the third party system 130. For example, a measure of accuracy associated with an email address type of user identifying information is based on scores associated with identified users associated with user identifying information including an email address matching an email address included in user identifying information associated with a user of the third party system 130. As another example, a measure of accuracy associated with a set of name and location is based on scores associated with identified users associated with user identifying information including both a name and a location matching a name and a location included in user identifying information associated with a user of the third party system 130. In one embodiment, a measure of accuracy associated with a type of user identifying information is an average of the scores associated with identified users associated with user identifying information including the type of user identifying information matching the type of user identifying information included in user identifying information associated with a user of the third party system 130. Alternatively, the measure of accuracy associated with a type of user identifying information is based on a number of identified users associated with user identifying information including the type of user identifying information matching the type of user identifying information included in user identifying information associated with a user of the third party system 130 and associated with at least a threshold score. For example, a measure of accuracy associated with a type of user identifying information is a ratio of a total number of online system users associated with the type of user identifying information that matches the type of user identifying information associated with a third party system user and also associated with at least a threshold score to a total number of online system users associated with the type of user identifying information matching the type of user identifying information associated with a third party system user.

Based on the measures of accuracy associated with types of user identifying information or sets of types of user identifying information, the online system 140 ranks 330 the types of user identifying information or sets of types of user identifying information. In some embodiments, the ranking includes types of user identifying information as well as sets of user identifying information. Alternatively, individual types of user identifying information are ranked 330, while sets of types of user identifying information are separately ranked 330. For example, types of user identifying information with higher measures of accuracy (i.e., types of user identifying information more likely to identify a particular user) have higher positions in the ranking, while types of user identifying information with lower measures of accuracy (i.e., types of user identifying information less likely to identify a particular user) have lower positions in the ranking. The online system 140 stores the ranking, allowing the online system 140 to maintain information describing the likelihoods of different types of user identifying information identifying a specific online system user.

The third party system 130 may leverage the ranking of types of user identifying information to determine types of user identifying information capable of identifying an online system user with a specified accuracy. In one embodiment, the third party system 130 requests 335 a specified measure of accuracy for identifying online system users from the online system 140. For example, the third party system 130 requests 335 a 95% measure of accuracy in identifying online system users. From the ranking of types of user identifying information, the online system 140 identifies 340 one or more types of user identifying information associated with at least the threshold measure of accuracy. In the preceding example, the online system 140 identifies 340 types of user identifying information or sets of types of user identifying information associated with at least a 95% measure of accuracy. The identified types of user identifying information or sets of types of user identifying information may be communicated to the third party system 130, allowing the third party system 130 to specify an identified type of user identifying information or set of types of user identifying information for use to identify online system users.

Alternatively, the third party system 130 communicates to the online system 140 an indication of types of user identifying information associated with a user of the third party system 130 matching types of user identifying information maintained by the online system 140 or by another third party system 130. In some embodiments, the indication includes a request for a measure of the capability of the types of user identifying information in the indication to identify specific users of the online system 140 or of the additional third party system 130. The online system 130 accesses the ranking of types of user identifying information and identifies sets of types of user identifying information including the user identifying information included in the indication. From the identified sets of types of user identifying information, the online system 140 identifies a maximum measure of accuracy associated with the identified sets of types of user identifying information. The online system 140 communicates information to the third party system 130 based on the identified maximum measure of accuracy, allowing the third party system 130 to receive information form the online system 140 describing the ability of the types of user identifying information included in the indication to identify specific users of the additional third party system 130 or of the online system 140. For example, if the indication from the third party system 130 includes location and phone number as types of user identifying information, the online system 140 retrieves from the ranking a set of types of user identifying information including location and phone number and associated with a maximum measure of accuracy relative to measure of accuracy associated with other sets of user identifying information in the ranking including location and phone number. The information communicated to the third party system 130 may be the identified maximum measure of accuracy or may be a value based on the identified maximum measure of accuracy. For example, the online system 140 compares the identified maximum measure of accuracy to a threshold measure of accuracy and communicates a value to the third party system 130 based on the comparison. A value may be communicated to the third party system 130 if the identified maximum measure of accuracy exceeds or equals the threshold measure of accuracy, while a different value may be communicated to the third party system 130 if the identified maximum measure of accuracy is less than the threshold measure of accuracy. In various embodiments, the threshold measure of accuracy is included in the indication received from the third party system 130 or the threshold measure of accuracy is maintained by the online system 140.

While FIG. 3 shows an example where the online system 140 determines 325 the measure of accuracy associated with different types of user identifying information, in other embodiments an additional third party system 130 may determine 325 the measures of accuracy. For example, the online system 140 and the third party system 130 each communicate user identifying information associated with online system users and third party system users, respectively, to the additional third party system 130. As described above, the additional third party system 130 identifies 315 online system users associated with one or more types of user identifying information matching one or more types of user identifying information associated with third party system users. The additional third party system 130 determines 320 scores associated with each identified user based on the types of user identifying information associated with an identified user by the online system 140 matching user identifying information associated with a user of the third party system 130. Based on the scores, the additional third party system 130 determines 325 measures of accuracy associated with different types of user identifying information and ranks 330 the types of user identifying information based on the measures of accuracy, as described above. The additional third party system 130 may communicate the ranking to the third party system 130 or may identify types of user identifying information that identify an online system user with at least a specified measure of accuracy in response to a request from the third party system 130 including the specified measure of accuracy. Similarly, the online system 140 may receive types of user identifying information from a third party system 130 and from an additional third party system 130 and rank types of user identifying information as described above based on third party system users associated with one or more types of user identifying information matching types or user identifying information associated with users of the additional third party system 130.

In alternate embodiments, the method described in conjunction with FIG. 3 may be substantially similar, except the online system 140 determines 325 measures of accuracy associated with different types of user identifying information and subsequently determines 320 scores based on the determined measure of accuracy. Additionally, while FIG. 3 shows the third party system 130 requesting 335 a specified measure of accuracy for identifying online system users from the online system 140, in alternate embodiments, the online system 140 determines a specified measure of accuracy using the provided user identifying information. This may be useful provide the online system 140 with greater flexibility as to what types of user identifying information are identified 340 by the online system 140.

Figure 4:
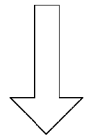
FIG. 4 is an example of determining measures of accuracy with which types of user identifying information identify online system users, in accordance with an embodiment.

FIG. 4 is an example of ranking types of user identifying information based on measures of accuracy associated with types of user identifying information. In the example of FIG. 4, the online system 140 determines scores associated with online system users and determines measures of accuracy for the types of user identifying information based on the scores. User identifying information associated with various online system users is compared to user identifying information associated with third party system users provided by a third party system 130 to the online system 140. In the example of FIG. 4, types of user identifying information associated with an online system user include a name 405A, a date of birth 405B, a gender 405C, a location 405D, an email address 405E, and a phone number 405F (also referred to individually and collectively as types of user identifying information 405).

Different types of user identifying information 405 associated with various online users are compared to user identifying information associated with third party system users and the online system 140 maintains information 400 identifying types of user identifying information 405 associated with an online system user that matches types of user identifying information associated with a third party system user. In the example of FIG. 4, the information 400 includes a value of "1" associated with a type of user identifying information 405 associated with an online system user that matches the corresponding type of user identifying information associated with a third party system user and includes a value of "0" associated with a type of user identifying information associated with the online system user that does not match the corresponding type of user identifying information associated with a third party system user. The information 400 shown in the example of FIG. 4 includes various online system user identifiers 402 and associates values with types of user identifying information 405 associated with an online system user identifier 402. For example, comparing user identifying information 405 associated with an online system user associated with an online system user identifier 402 of "1234" has a name 405A, a gender 405C, and a location 405D matching a name 405A, a gender 405C, and a location 405D associated with a third party system user; hence, a value of "1" is associated with the name 405A, the gender 405C, and the location 405D associated with the user having online system user identifier "1234." As another example, in FIG. 4, the user associated with online system user identifier 3423 has a name 405A, a date of birth 405B, a gender 405C, a location 405D, an email 405E, and a phone number 405F matching the corresponding types of user identifying information 405 associated with a third party system user, so the information 400 includes a value of "1" associated with each of the preceding types of user identifying information 405.

From the values associated with different types of user identifying information 405, the online system 140 determines a score 410 associated with each online system user associated with a type of user identifying information 405 matching a corresponding type of user identifying information associated with a third party system user. In the example of FIG. 4, the score 410 associated with a user is a sum of the values associated with types of user identifying information 405 associated with the user. As an example, in FIG. 4 the score 410 associated with the user having online system user identifier of "1234" is 3, while the score 410 associated with the user having online system user identifier of "3423" is associated with a score of 6. However, in other embodiments, the score 410 associated with a user may be determined based on the values associated with types of user identifying information 405 associated with the user via any suitable method.

Based on the scores 410 associated with each user, the online system 140 determines a ranking 415 of different types of user identifying information 405. The ranking 415 is based on measures of accuracy 420 associated with different types of user identifying information 405 associated with online system users. A measure of accuracy 420 associated with a type of user identifying information 405 describes a likelihood of identifying a specific online system user if the type of user identifying information 405 is provided to the online system 140. For example, a measure of accuracy associated with a type of user identifying information 405 is a ratio of a total number of online system users associated with the type of user identifying information 405 that matches the type of user identifying information associated with a third party system user and also associated with at least a threshold score to a total number of online system users associated with the type of user identifying information matching the type of user identifying information associated with a third party system user. As a specific example, if 72 online system are associated with a type of user identifying information matching the type of user identifying information associated with a third party system user and 70 of the online system users associated with the matching type of user identifying information are associated with at least a threshold score, the measure of accuracy of the type of user identifying information is 70/72, or 97%. In the example of FIG. 4, the ranking 415 includes sets including multiple types of user identifying information, allowing the ranking 415 to describe the likelihood of identifying a specific online system user if a combination of the types of user identifying information 405 included in the set is received by the online system 140.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:
   receiving, at an online system, user identifying information describing one or more users of a third party system;
   retrieving, by the online system, user identifying information describing one or more users of the online system;
   comparing the received user identifying information describing the one or more users of the third party system to the retrieved user identifying information describing the one or more users of the online system;
   for each comparison of user identifying information describing a user of a third party system to user identifying information describing a user of the online system:
      determining a score associated with the user of the online system based at least in part on one or more types of user identifying information describing the user of the online system matching one or more types of user identifying information describing the user of the third party system;
   for one or more sets including one or more types user identifying information, determining a measure of accuracy of a set based at least in part on one or more scores associated with users of the online system having the one or more types of user identifying information in the set describing the one or more users of the online system matching the one or more types of user identifying information in the set describing at least one user of the third party system; and
   generating a ranking of the one or more sets of user identifying information based at least in part on the determined measures of accuracy.

2. The method of claim 1, wherein determining the score associated with the user of the online system based at least in part on one or more types of user identifying information describing the user of the online system matching one or more types of user identifying information describing the user of the third party system comprises:
   determining a number of types of user identifying information describing the user of the online system matching types of user identifying information describing the user of the third party system; and
   determining the score based at least in part on the determined number of types of user identifying information describing the user of the online system matching types of user identifying information describing the user of the third party system.

3. The method of claim 1, wherein determining the score associated with the user of the online system based at least in part on one or more types of user identifying information describing the user of the third party system matching one or more types of user identifying information describing the user of the online system comprises:
associating weights with each type of user identifying information describing the user of the online system matching a type of user identifying information describing the user of the third party system; and
determining the score based at least in part on the associated weights.

4. The method of claim 1, further comprising:
receiving a specified measure of accuracy for matching one or more users of the third-party system with one or more users of the online system; and
identifying one or more sets including one or more types user identifying information associated with a measure of accuracy equaling or exceeding the specified measure of accuracy based at least in part on the ranking.

5. The method of claim 1, wherein determining the measure of accuracy of the set based at least in part on one or more scores associated with users of the online system having the one or more types of user identifying information in the set describing the one or more users of the online system matching the one or more types of user identifying information in the set describing at least one user of the third party system comprises:
retrieving scores associated with each user of the online system associated with the one or more types of user identifying information in the set matching the one or more types of user identifying information in the set associated with at least one user of the third party system; and
determining the measure of accuracy of the set based at least in part on the retrieved scores.

6. The method of claim 5, wherein determining the measure of accuracy of the set based at least in part on the retrieved scores comprises:
determining the measure of accuracy of the set as an average of the retrieved scores.

7. The method of claim 1, wherein determining the measure of accuracy of the set based at least in part on one or more scores associated with users of the online system having the one or more types of user identifying information in the set describing the one or more users of the online system matching the one or more types of user identifying information in the set describing at least one user of the third party system comprises:
retrieving scores associated with each user of the online system associated with the one or more types of user identifying information in the set matching the one or more types of user identifying information in the set associated with at least one user of the third party system; and
determining a number of users of the online system associated with at least a threshold score; and
determining the measure of accuracy of the set based at least in part on the determined number of users of the online system.

8. The method of claim 7, wherein determining the measure of accuracy of the set based at least in part on the determined number of users of the online system comprises:
determining the measure of accuracy of the set as a ratio of the determined number of users of the online system to a total number of online system users associated with the one or more types of user identifying information in the set matching the one or more types of user identifying information in the set associated with at least one user of the third party system.

9. The method of claim 1, wherein the one or more types of user identifying information are selected from a group consisting of: a name, a date of birth, a gender, a geographic location, a phone number, an email address, an online system user identifier, and any combination thereof.

10. A non-transitory computer program product comprising a computer readable storage system having instructions encoded thereon that, when executed by a processor, cause the processor to:
receive, at an online system, user identifying information describing one or more users of a third party system;
retrieve, by the online system, user identifying information describing one or more users of the online system;
compare the received user identifying information describing the one or more users of the third party system to the retrieved user identifying information describing the one or more users of the online system;
for each comparison of user identifying information describing a user of a third party system to user identifying information describing a user of the online system:
determine a score associated with the user of the online system based at least in part on one or more types of user identifying information describing the user of the online system matching one or more types of user identifying information describing the user of the third party system;
for one or more sets including one or more types user identifying information, determine a measure of accuracy of a set based at least in part on one or more scores associated with users of the online system having the one or more types of user identifying information in the set describing the one or more users of the online system matching the one or more types of user identifying information in the set describing at least one user of the third party system; and
generate a ranking of the one or more sets of user identifying information based at least in part on the determined measures of accuracy.

11. The computer program product of claim 10, wherein the one or more types of user identifying information are selected from a group consisting of: a name, a date of birth, a gender, a geographic location, a phone number, an email address, an online system user identifier, and any combination thereof.

12. The computer program product of claim 10, wherein determine the score associated with the user of the online system based at least in part on one or more types of user identifying information describing the user of the online system matching one or more types of user identifying information describing the user of the third party system comprises:
determine a number of types of user identifying information describing the user of the online system matching types of user identifying information describing the user of the third party system; and
determine the score based at least in part on the determined number of types of user identifying information describing the user of the online system matching types of user identifying information describing the user of the third party system.

13. The computer program product of claim 10, wherein determine the score associated with the user of the online system based at least in part on one or more types of user identifying information describing the user of the third party system matching one or more types of user identifying information describing the user of the online system comprises:
associate weights with each type of user identifying information describing the user of the online system matching a type of user identifying information describing the user of the third party system; and
determine the score based at least in part on the associated weights.

14. The computer program product of claim 10, wherein the computer readable storage medium further has instructions encoded thereon that, when executed by the processor, cause the processor to:
receive a specified measure of accuracy for matching one or more users of the third-party system with one or more users of the online system; and
identify one or more sets including one or more types user identifying information associated with a measure of accuracy equaling or exceeding the specified measure of accuracy based at least in part on the ranking.

15. The computer program product of claim 10, wherein determine the measure of accuracy of the set based at least in part on one or more scores associated with users of the online system having the one or more types of user identifying information in the set describing the one or more users of the online system matching the one or more types of user identifying information in the set describing at least one user of the third party system comprises:
retrieve scores associated with each user of the online system associated with the one or more types of user identifying information in the set matching the one or more types of user identifying information in the set associated with at least one user of the third party system; and
determine the measure of accuracy of the set based at least in part on the retrieved scores.

16. The computer program product of claim 15, wherein determine the measure of accuracy of the set based at least in part on the retrieved scores comprises:
determine the measure of accuracy of the set as an average of the retrieved scores.

17. The computer program product of claim 15, wherein determine the measure of accuracy of the set based at least in part on one or more scores associated with users of the online system having the one or more types of user identifying information in the set describing the one or more users of the online system matching the one or more types of user identifying information in the set describing at least one user of the third party system comprises:
retrieve scores associated with each user of the online system associated with the one or more types of user identifying information in the set matching the one or more types of user identifying information in the set associated with at least one user of the third party system; and determine a number of users of the online system associated with at least a threshold score; and
determine the measure of accuracy of the set based at least in part on the determined number of users of the online system.

18. The computer program product of claim 17, wherein determine the measure of accuracy of the set based at least in part on the determined number of users of the online system comprises:
determine the measure of accuracy of the set as a ratio of the determined number of users of the online system to a total number of online system users associated with the one or more types of user identifying information in the set matching the one or more types of user identifying information in the set associated with at least one user of the third party system.

19. A method comprising:
receiving, at an online system, an indication of one or more types of user identifying information describing a user of a third party system matching one or more types of user identifying information describing a user of an additional third party system;
retrieving data maintained by the online system including measures of accuracy associated with a plurality of sets of types of user identifying information, a measure of accuracy associated with a set of user identifying information based at least in part on users of the third party system online having one or more types of user identifying information in the set matching the one or more types of user identifying information in the set associated with at least one user of the additional third party system;
identifying a selected set of types of user identifying information including the one or more types of user identifying information included in the received indication and associated with a maximum measure of accuracy; and
communicating the identified maximum measure of accuracy to the third party system.

20. The method of claim 19, wherein the received indication includes a query requesting a measure of confidence of the one or more types of user identifying information identifying a particular user of the additional third party system.

21. The method of claim 19, wherein communicating the identified maximum measure of accuracy to the third party system comprises:
comparing the identified maximum measure of accuracy to a threshold measure of accuracy; and
communicating a value based on the comparison to the third party system based on the comparison.

22. The method of claim 21, wherein the threshold measure of accuracy is included in the received indication.

23. The method of claim 21, wherein the threshold measure of accuracy is maintained by the online system.

24. The method of claim 19, wherein the data maintained by the online system including measures of accuracy associated with a plurality of sets of types of user identifying information comprises a ranking of the plurality of sets of user identifying information based at least in part on the measures of accuracy.

* * * * *